350-168
CROSS REFERENCE SEARCH ROOM
TX350/168

Feb. 28, 1967 W. T. CUNNALLY 3,306,974

COLOR REPRODUCTION WITH A MONOCHROMATIC GRADIENT LINE IMAGE

Filed March 8, 1963 5 Sheets-Sheet 1

INVENTOR
William T. Cunnally
BY
Watson & Harbaugh
Atty.

COLOR REPRODUCTION WITH A MONOCHROMATIC GRADIENT LINE IMAGE

Filed March 8, 1963 5 Sheets-Sheet 2

INVENTOR.
William T. Cunnally
BY
Watson D. Harbaugh
Atty.

Feb. 28, 1967 W. T. CUNNALLY 3,306,974

COLOR REPRODUCTION WITH A MONOCHROMATIC GRADIENT LINE IMAGE

Filed March 8, 1963 5 Sheets-Sheet 3

INVENTOR.
William T. Cunnally
BY
Watson D. Harbaugh
Atty.

Feb. 28, 1967 W. T. CUNNALLY 3,306,974

COLOR REPRODUCTION WITH A MONOCHROMATIC GRADIENT LINE IMAGE

Filed March 8, 1963 5 Sheets-Sheet 4

INVENTOR.
William T. Cunnally
BY
Watson D. Harbaugh
Atty.

COLOR REPRODUCTION WITH A MONOCHROMATIC GRADIENT LINE IMAGE

Filed March 8, 1963 5 Sheets-Sheet 5

INVENTOR
William T. Cunnally
BY
[signature]
Atty.

United States Patent Office 3,306,974
Patented Feb. 28, 1967

3,306,974
COLOR REPRODUCTION WITH A MONOCHROMATIC GRADIENT LINE IMAGE

William T. Cunnally, Morton Grove, Ill., assignor of fifty percent to Gilbert R. Johnson, Park Ridge, Ill.
Filed Mar. 8, 1963, Ser. No. 263,945
4 Claims. (Cl. 178—5.2)

Figure 1:
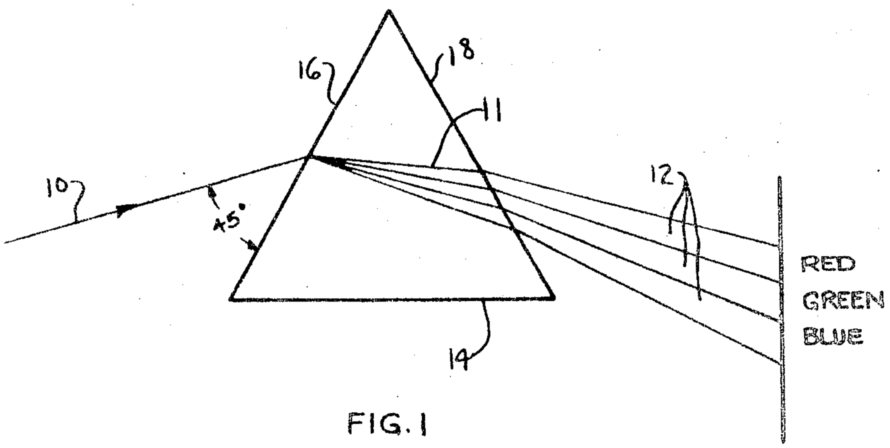

The present invention relates to the method and apparatus for reproducing a color picture from an original image by translating the original image into an intelligible monochromatic gradient line image registered in parallel coincidence on a previously prepared color separation surface of color lines with the gradiency in each image line related to each respective color line in a proportion directly related to the degree that the respective colors are present at corresponding points in the original image.

"Color picture" as used herein refers to the reproduction viewed by a person and includes the perception of color from pigments, dyes and light rays; "original image" contemplates the image being reproduced and can either be an animated or a still life scene; "monochromatic image" refers to the image that is translated and generally relates to a novel light absorbing image made up of laterally spaced gradient lines which would appear dark upon a light transmitting surface of high value; and, "prepared color separation surface" comprises parallel lines of a cyclically or sequentially arranged series of light emanating colors, preferably complementary to one another, and recurrently arranged in repetitive groups across the working surface of a viewable media such as a sheet of paper, screen, or transparency.

More particularly, the monochromatic image comprises a composition of parallel gradient lines derived from separating selected colors present in the original image into impulse lines and then recording them gradiently in relationship to the light intensity of the colors in the original image. Then when the monochromatic image is combined with a prepared surface having correspondingly correlated light transmitting color lines thereon of complementary colors, the light absorbing gradiency of the image lines exposes only the corresponding color lines in a relationship gradient to the presence of such colors at the places they appear in the original image. Thus, a monochromatic image imposed upon a color separation pattern provides a determined color line blanking effect which induces in exposed areas the perception of a color picture or pattern, or a desired variation therefrom, that is substantially identical with the pattern present in the original image.

The monochromatic images can be translated by printing or copying with or without a halftone screen, and by photography, telephoto and television, or the like. The images translated can be used as end products themselves, if desired, or further used either to obscure or illuminate significant areas of the color lines on the color separation surface, in whole in in part, to indue the perception of a color picture whether viewed on a translucent surface or as a reflection from pigmented opaque surfaces.

The gradient lines are of equal rated width but preferably have their gradiency related to a varying width or a halftone screen of controlled varying opaqueness in instances where illumination of the color picture is constant as in printing or the like. However, where the color surface is a translucent or fluorescent medium as in projection or television, the gradiency may be related to variable illumination or scan beam intensity. The color lines are also preferably of equal rated widths and although the rated widths of the gradient lines and the color lines can also be equal to each other, it is preferable to have the rated width of the gradient lines a little wider than that of the color lines.

The finer and the greater the number of lines per inch, the greater the detail and fidelity resulting when viewing the color picture. More particularly, it is desired that the width and spacing of the color lines be such that when viewed with the naked eye at an arm's length distance of approximately two feet, the color lines are fused perceptively to produce a gray cast under normal illumination. For this distance it has been found that the number of the color lines may range from as few as 80 to as many as 500 per inch but preferably for all practical applications between 120 to 150 lines per inch with each approximately .0045 inch width. However, for artistic effects, if desired, the wider and the lesser the number of lines per inch, the greater will be the perception of a rough textured or scratchboard picture.

As mentioned, the invention is effective with complementary pigment colors as well as complementary light ray colors. The essential difference is well known psychologically that the complementary colors themselves are determined by the objective media from which the colors emanate for viewing. For instance, in printing or painting the complementary colors are those that are associated in the trade with pigments when mixed, while in reflective or translucently illuminated pictures, the complementary colors are those that are related to spectral or light ray perception. In either case it is preferred that the complementary colors selected be three in number for depth of color and be those which when disposed in contiguous color lines are individually indistinguishable and compositely produce the perception of a balanced "white" which in effect appears to be gray against a bright white background and a light gray against a gray background.

It should be noted that since the colors in the color lines never are mixed together physically on the color separation surface, they do not act like pigment mixtures, but rather as colors in light which when placed side by side constitute separately reflected rays which blend perceptively to be perceived as a color mixture.

This brings the tricolor complementary color factors of light rays into printing where heretofore pigment mixtures have required different considerations.

By way of example in pigmentary printing mixtures, red, yellow, and blue are complementary in a subtractive relationship in which light ray complementaries are absorbed and the unabsorbed is reflected as the color viewed, whereas, the three primary colors for an "additive" light process of color mixing are well known hues of yellowish red, green, and blue, the ones generally associated as complementary colors in light. Their chief characteristic is that each is distinctive and is not capable of mixing one with one other to produce the third. However, when all three primaries are combined in a definite proportion, a balanced "white" is produced. Red and green side by side perceptively fuse to provide yellow. The combination of red and blue produces magenta (bluish-red), while blue and green combine to make cyan (greenish-blue).

Yellow, magenta, and cyan are the secondary colors that are the light ray complements of blue, green, and red, respectively. When a secondary color is combined with its complementary primary, "white" is also produced. Also, combining yellow with blue produces "white." Cyan added to red results in "white," and magenta plus green gives "white." Carried further, the complementary secondary colors when added together also produce a balanced "white."

Accordingly, blocking out a yellow line on the color separation surface will permit the adjacent color lines of cyan and magenta to provide a mixture effect which is perceived as blue when illuminated with a white light. Blocking out cyan permits magenta and yellow to be perceived as red, and blocking out magenta leaves a perception of green. Furthermore, blocking out two color lines will leave the third unchanged with the result that selective and gradient blocking can provide any desired color or color mixture for a color picture including tints and hues as well as color values with a single use of a monochromatic image.

Moreover, since the color lines are located side by side and colors are mixed perceptively, the colors perceived are clearer than they can be made with color plates in conventional three and four color printing, even with fine screen halftones, where color inks are printed in overlapping or subtractive relationship.

The primary object of the invention is to provide a color picture producing system of high quality and reliability with low operating cost and substantial savings in time, yet is compatible with and utilizes existing equipment to a large degree.

Accordingly, one of the objects of the present invention is to provide a prepared surface as a stocked or reusable medium in which color lines extend longitudinally of a sheet or paper roll stock at a predetermined lateral orientation or registration thereon. Then as controlled by a single registration adjustment a gradient black and white picture is recurrently printed on the prepared surface to block out particular colors in whole or in part at points where such colors on the prepared surface are absent from the subject in corresponding degree and the gradiently unblocked colors remain apparent with a perceptive effect of a full color reproduction of the original subject.

A further advantage of the invention resides in the prepared color separation surface which is simple to manufacture and inventory and not only provides a multi-color picture with a single application of a monochromatic gradient image that can be located with a single registration reference, but also provides a surface having fine color lines on it that affords a pleasing perception of depth or color vibrancy when viewed by itself as where used as a covering for a wall, or the like or, as a border for color pictures, it being noted that the eye cannot focus simultaneously on complementary colors due to color aberration in the human eye.

The invention is further characterized by a monochromatic image which is useful by itself as an intelligible product and record which can be viewed, reproduced and stored as a single element, yet carries concealed information until revealed by color coding lines.

Another feature of the invention resides in color substitution study effects wherein prepared color separation surfaces of varying primary, or secondary color relationships can be used interchangeably with a gradient monochromatic key image to accomplish different intelligible perception effects and advantages.

A further object of the invention is to provide an improved spectral or additive color separation device which is simple to manufacture and easy to use repeatedly in place of halftone screens or color filters for the preparation of a single monochromatic image record of a selected number of colors in a color image or pattern.

It is a further object of the invention to cyclically shift a scan line pattern laterally in a slight step in a series of scans across the face of an original image with each line limited to a particular color, to provide a composite gradient line monochromatic image and reproduce the image on a color line separation surface for viewing or recording.

It is a further object of the invention to cyclically shift a scan line pattern laterally in slight steps in a series of scans across the face of an original image with each line limited to a particular color, as in television broadcasting to provide a composite gradient line black and white image and reproduce the image on a color line separation surface of fluorescent material to fill the screen with vertically uninterrupted illumination.

These being among the objects of the invention other and further objects will become apparent from the description and accompanying drawings in which all views are diagrammatical representations of devices embodying the invention.

Figure 2:
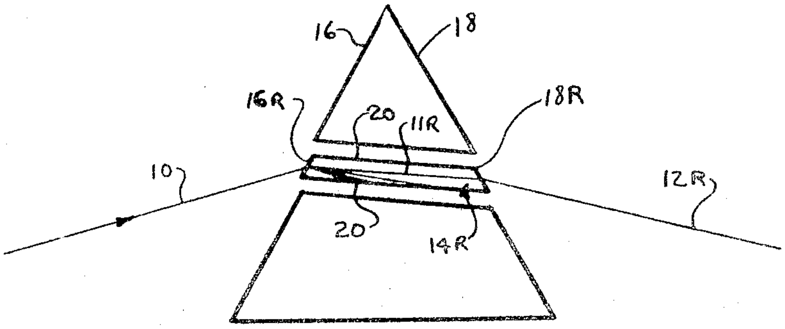
Figure 3:
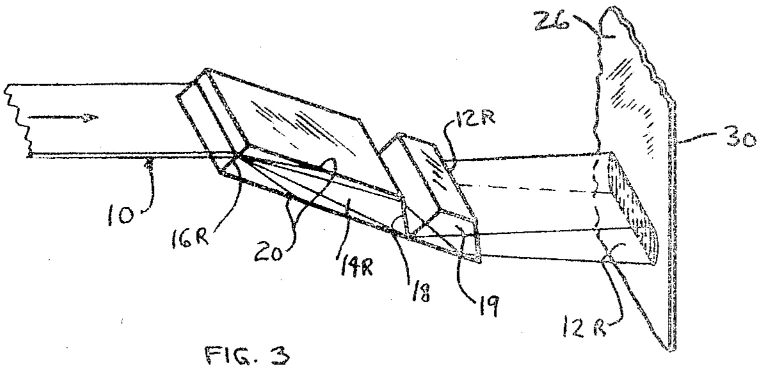
Figure 3A:
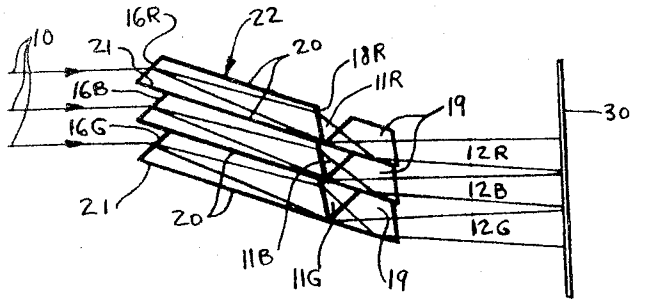
Figure 4:
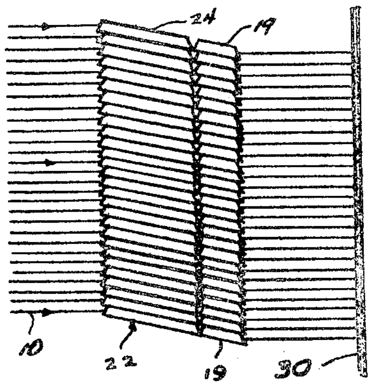
Figure 5:
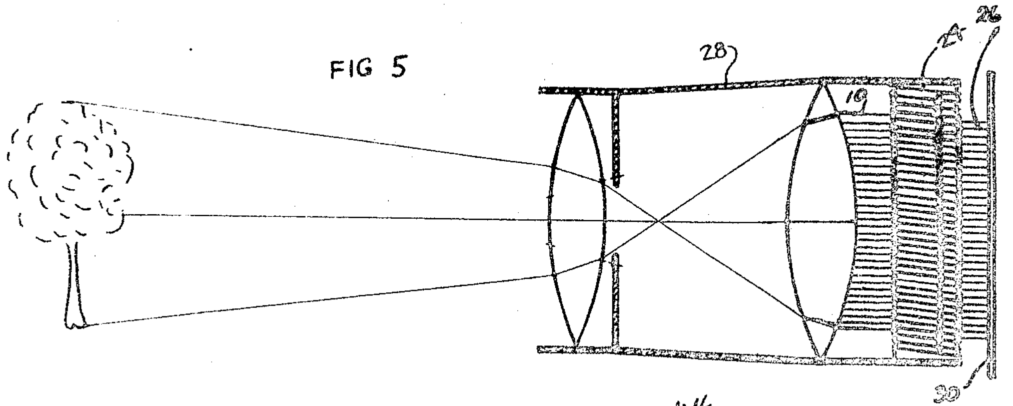
Figure 9:
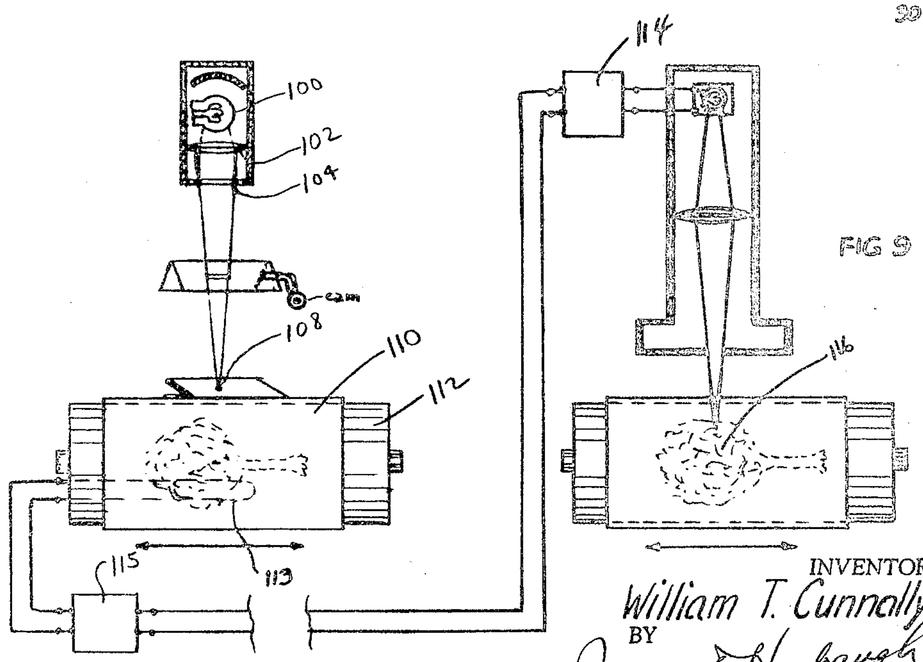
Figure 8E:
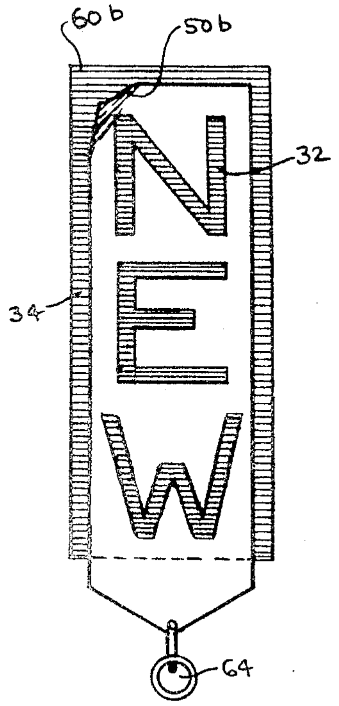
Figure 7:
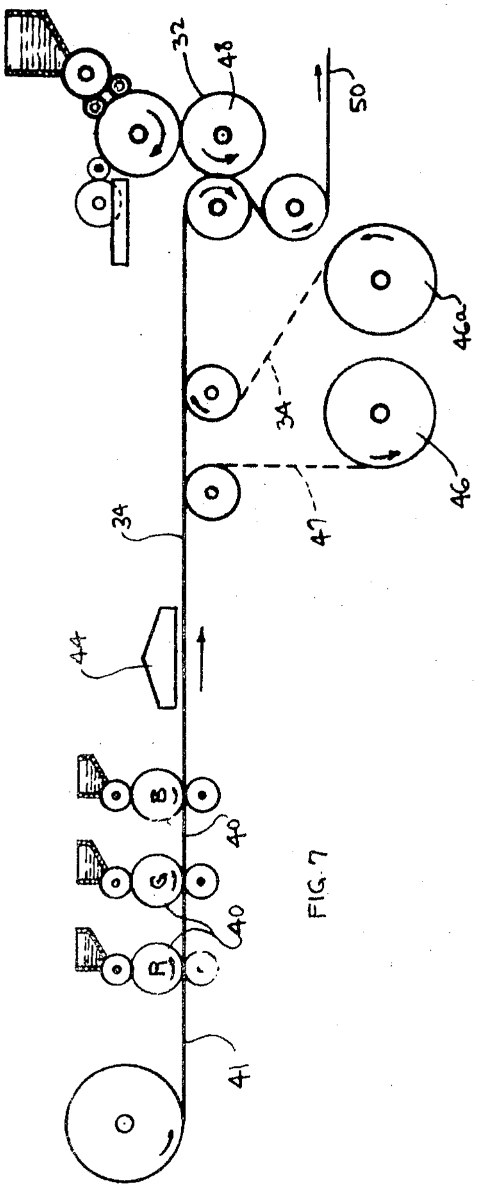
Figure 6:
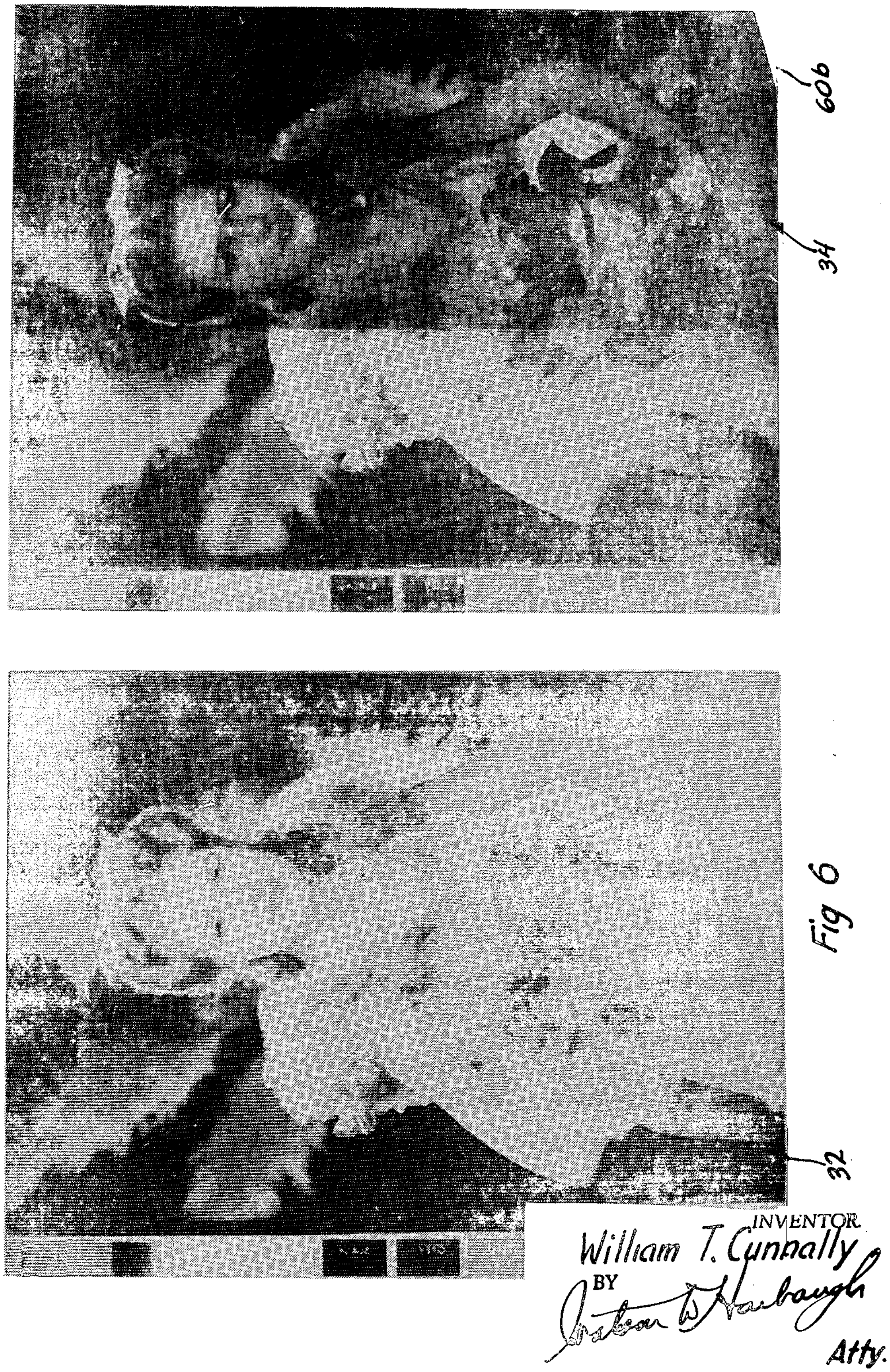

FIG. 1 is an explanatory representation of the prismatic separation and selection of spectral colors, FIG. 2 is an explanatory view of truncated prisms for single color transmission, FIG. 3 is an enlarged perspective view of a truncated prism element used as a single color transmitting unit, FIG. 3*a* is an elevational view of a tri-color assembly of elements such as shown in FIG. 3, FIG. 4 is an elevational view of a color separation screen of laminated prism assembly elements shown in FIG. 3*a*, FIG. 5 is an elevational view demonstrating the use of the color separation screen shown in FIG. 4, FIG. 6 is a plan showing of a color print made in accordance with and embodying the invention, FIG. 7 is a plan view flow sheet representation of a way to produce articles embodying the invention, FIGS. 8*a–h* are plan views of various embodiments of the invention including integrated articles in FIGS. 8*a–d*, animated articles in FIGS. 8*e* and *f*, and FIG. 9 is a plan view of a telephoto reproduction of color pictures embodying the invention.

Referring now to the drawings for a fuller understanding of the invention. It will be seen in FIG. 1 how a single beam of white light 10 is refracted at 11 and dispersed into a spectrum 12 of colors when passed through a prism 14. The single beam is made up of an octave of visible rays of different frequencies or wave lengths (red 33,000 and purple 67,000 waves per inch) and when entering the prism 14 preferably at an angle of 45° their velocity changes in relation to their frequencies and the refraction index of the prism material, which is preferably made of a dense flint glass with an index of refraction of approximately 1,648 which provides the greatest spectral dispersion consistent with the least loss of light.

As the beam 10 enters the prism 14 at an angle as indicated, the color rays are refracted in the prism in a direction more normal to the entrance face 16. Then as they leave the prism, they are dispersed more toward the plane of the exit face 18. The greater the frequency (shorter wave lengths), the greater the refraction and dispersion. Thus the color rays pass through the prism and leave the prism at different angles in relation to their frequencies.

Now if truncation of the prism is made on parallel planes as shown in FIG. 2 in relation to the path of the red ray in the beam of white light 10 entering the prism and the planes are close enough that only rays of a single color are permitted to pass through, such as red then only the ray 12R will leave the prism. Thus, a color separation element for red alone is provided. To assure color purity the faces of truncation of 18R are coated with a black, light-absorbent coatings as at 20 so that the other colors entering the prism are absorbed or blocked from emission and only red comes through.

However, it will be observed that the resulting overall angle of light refraction ranges approximately from 115° for blue to 130° for red. Although such can be used with a light sensitive plate it is preferred to return the color rays to a direction of travel which is parallel to the projected direction of travel of the beam of light 10. In FIG. 3 such a device is shown where the color beam is refracted by another prism 19 to the desired direction. In the system shown, the truncated segment 14R is approximately .004" thick and of a width greater than .008" so that side band rays are dispersed against the coated surfaces 20 of truncation where they are absorbed.

Now, if a second prism is truncated like segment 14R but at a little different angle so that this time the faces of truncation are parallel to the path of the blue ray 11B through the prism, then an element 14B is formed and coated which can be laminated on 14R to pass only blue rays 12B next to the red rays 12R. Similarly an element 14G can also be provided to pass green rays 11G and 12G. Then when all three are laminated together, they form a tri-color filter unit 22 as shown in FIG. 3*a*. Moreover, the filter units 22 can be in turn laminated to form filter screens.

It will be observed in FIG. 3*a* that the rays 12R, 12B and 12G each are diverging. It is desired to locate the light responsive or sensitive screen 30 just ahead of the area in which rays of adjacent colors begin to intermingle.

It will be observed that since the faces of truncation are parallel with their respective rays and laminated to be parallel throughout, one or both of two factors must be correlated. Either the respective entrance face 16 of each lamination must always be oriented to the white light beam 10 at respective angles of appropriate incidence or the prism density can be decreased for shorter color wave lengths, or increased for longer wave lengths so that light beams 10 for all prism segments are parallel or otherwise determined. In either event the wider and the thinner the segment, the greater will be the resultant color value. Moreover, reflected light at the entering surface 16 is trapped and absorbed in the overhang 21 of adjacent laminations.

Although the angle of the exit face of each segment 14 can be normal to the refracted ray, and then can be placed against a light registering surface to form a monochromatic recording, it is preferred for clearer imagery to have the respective dispersion angles at the exit surface 18 so determined that the color light rays R, G and B leave the prism segments 14 parallel with one another. Then with the refraction prisms 19 located as shown the color rays travel equal distances parallel to each other upon entering, passing through and leaving the prisms.

When like tri-color subassemblies 22 are laminated into a main assembly 24 as shown in FIG. 4, it will also be noted that each entrance face 16 serves as a slit for all light striking it and the exit rays 11 are spaced single color rays of an intensity related to the relative intensity of the respective colors present in the light beams striking the entrance surfaces 16. Then when the resultant color light beams 12R, 12G and 12B strike a flat surface 26, they form gradient lines of light which can be controlled by a lens system 28 which, preferably as shown in FIG. 5, includes a suitable lens arrangement 28 to direct parallel rays of light 10 against the entrance faces 16 of the laminated screen 24 to pass therethrough and strike a light sensitive element such as a photographic plate 30. A gradient line monochromatic image can ultimately be developed from the plate 30 in which increased opaqueness of the gradient lines is related to the absence of the color in each respective color line. Halftone screens can be used if desired for the final monochromatic image if printing is to be involved.

Transparent color line filters of colors complementary to those recorded can be used instead of the prism screen but the prism system provides purer colors, and furthermore, can be adjusted within limits to relate the color separation to complementary colors of different hues depending upon the color separation surface expected to be used. A slight tilting to change the angle of incidence can vary the colors derived.

In providing the prism laminations the layers of thin prism glass are stacked face to face and then skewed compositely to an angle complementary to the angle determined for a particular color between the face 16 and the plane of truncation 20. The skewed stack is then clamped, edge ground and polished flat to ½ wave length to provide the appropriate angles for the entrance faces 16 accurate to 5 minutes of tolerance, one stack for one color angle, another stack for another color angle, etc. The stacks are then collated in to the groups of tri-color filters 22 that are then stacked to form the composite laminated device 24 just described.

Reference is made to FIG. 6 for a typical monochromatic image 32 evolved for lithographic screen reproduction from a monochromatic negative 30, taken as described with a tri-color prism filter 24 having 120 color lines per inch. This is representative of monochromatic images in either negative or positive form which may be embodied in black pigments or unilluminated shadows on either opaque, transparent or translucent color line separation surfaces.

The color separation surface 34 with which a monochromatic image cooperates preferably comprises orange-red, green and blue lines, or their respective complementary colors arranged parallel to each other in a recurrent order over a surface of sufficient size to receive the monochromatic image 32 with the same number of lines per inch as in the image and with the succession of colors the same as that used in producing the monochromatic image.

Preferably the lines are provided by printing the color lines 34 on the surface medium 41 as shown in FIG. 7 at one operation as by three color line printing rollers 40R, 40G and 40B, which are out of line enough to interlace the three color lines in equally spaced relationship. The colors may be pigment or dyes. The web is fed from a supply roll 42 and after printing is passed under a drier 44. It can be rewound as a storage roll 46 as shown by dotted lines 47 or used immediately with a monochromatic printing roller 48 for the final product at 50.

If the printed web is stored, the order of color lines are reversed to that employed for direct use because in using the storage roll 46 as a feed roll it is turned end for end when located at **46*a* so that the color line side is next to the roller 48**.

The medium 41 may be paper or a transparent or translucent material and with the monochromatic image on any of these same media, various combinations can be used in superposing one on another.

Figure 8F:
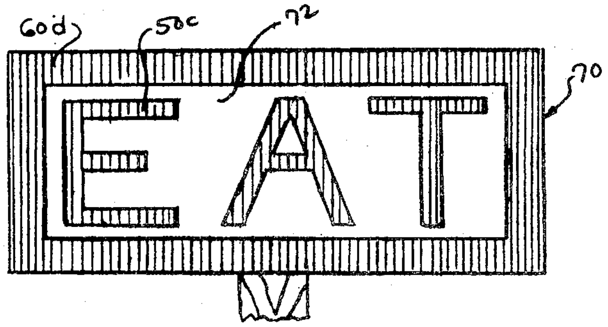
Figure 8G:
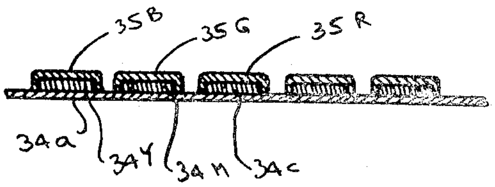
Figure 8H:
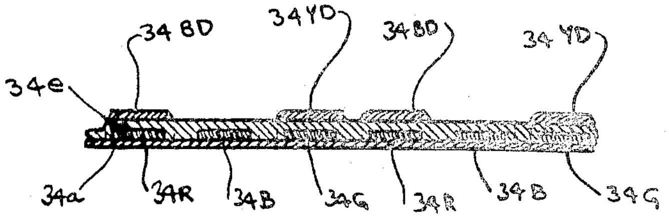
Figure 8D:
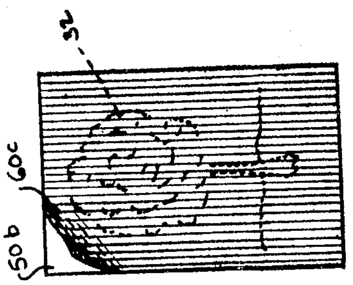
Figure 8C:
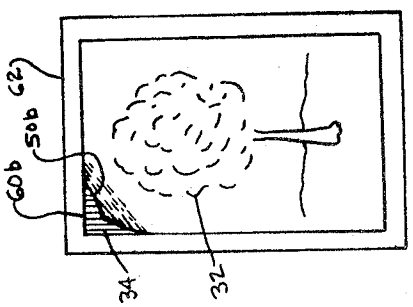
Figure 8B:
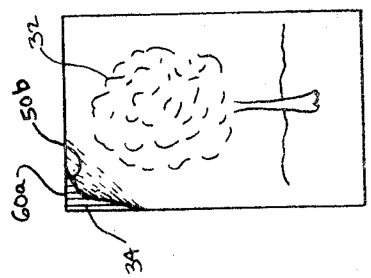
Figure 8A:
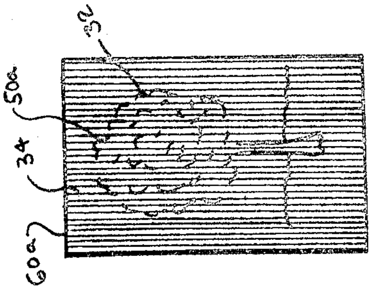

Accordingly in FIG. 8*a*, the color lines 34 on paper **60*a* receives the monochromatic image 50*a*** printed directly on it, or as in FIG. 8*b* on a transparent sheet **50*b* that in turn is superposed in registration on the color line paper 60*a***. In FIG. 8*c* the colors are dyes printed on a transparent plastic material **60*b* with the transparent image sheet superposed thereon for projection onto and to be viewed in front of an illuminated milk screen 62**. In FIG. 8*d* the color line sheet **60*c* is translucent as where a wall covering is used and the transparent monochromatic image sheet 50*b* is located behind it, thereby providing a gray appearing surface until image sheet 50*b*** is illuminated from behind whereupon a color picture appears.

In FIG. 8*e* the arrangement is similar to the embodiment shown in FIG. 8*c* where the gradient line images 32 are arranged to provide for solid colors in various areas and the sheets **60*b* and 50*b* are movable relative to each other by a cam arrangement 64** to continuously change the colors perceived for each area.

In FIG. 8*f* is shown a tourists sign 70 in which the vertical color lines at **60*d* are printed in fluorescent colors and the monochromatic image 50*c*** is held a slight horizontally spaced distance therefrom so that as the lights of an automobile and driver move angularly past the sign different fluorescent colors are exposed to view through the monochromatic image. A changing color sign is more attention commanding than a single color sign and the space between the image and color lines can be filled with a transparent protective layer of plastic 72 to provide the spacing desired.

A further embodiment of the invention is illustrated in FIG. 8*g* where color picture enlargements or the like can be made from a color picture or color transparencies. Preferably a sheet 34*a* of opaque or transparent material such as enlargement type paper or photographic film has a color line separation of secondary colors 34Y, 34M and 34C placed thereon and over each color line are placed energy sensitive materials or emulsions 35B, 35G and 35R gradiently responsive selectively to the intensity of the color rags of the primary color Blue, Green and Red respectively that are complementary to the respective color lines. Then when the sheet is exposed to a color transparency, as by an enlarger, the materials 35B, 35G and 35R upon exposure to their respective colors when developed in a conventional way with developer, short stop and fixer become a gradient monochromatic image already in register with the color lines and a color picture enlargement results which can be illuminated from in front or from behind.

Another embodiment in FIG. 8*h* would be to coat the whole color separation surface with a blue sensitive (orthochromatic) photographic emulsion 34*e* and over the red lines place a blue dye 34BD and over the green lines place a yellow dye 34YD. Then when the surface is exposed to the color image, the emulsion will darken when developed over the blue line if blue light is present and not over the red or green. If red light is present the blue filter will cause the emulsion under it to darken when developed. This results in a negative monochromatic image over the color line separation surface. Then the negative is conventionally bleached to remove the developed image, leaving undeveloped silver bromide which is then further treated with DK50 to provide a reversal positive image in which the separation line colors will be exposed to view where such colors were present in the original color image.

In these last two particular embodiments it is desired that the color lines and materials be superposed at the factory where there is little difficulty of making registration and the color lines can be as many as 200 per inch to obviate "graininess." Moreover, the materials being developed by the same chemicals, the process is as simple and fast as enlarging "black and white" pictures. This enables photo copies in colors which with other processes are too expensive at present to be commercial and also permits any size of picture to be made, transparent or opaque, without appearance of "grain" photographically with but a single exposure and a single development. It will be appreciated that the color lines should be the complements of the color expected if the photosensitive materials respond negatively or darken with an increase in light intensity.

The same system can also be used with a monochromatic thermosensitive or electrostatic responsive material over the color line separation surface in that the color lines will absorb as energy the corresponding color reflected from the color picture where in contact therewith. With onside radiation, the color lines should be the complements of the color that is to be revealed while with backside contact, as where the radiation passes through the color separation surface to reach the thermosensitive material disposed next to the color picture, the colors can be the same. In electrostatic color reproduction the positive monochromatic image is translated to an electrically charged backing plate which contacts the color line separation surface to control the deposition of negatively charged printing powder for gradient exposure of the color lines.

In FIG. 9 a method of telephotoing a color picture is shown wherein a white light is developed at bulb 100 condensed by lens 102 to pass as a narrow beam through slit 104 and enter a prism 106. The prism is rocked ever so slightly to vary the color ray that passes through a pin hole 108 and against a color transparency 110 wrapped upon a drum 112. The drum in turn is oscillated axially and turned slightly each oscillation and a photoelectric device 113 inside the drum responds to and registers through transmitter 115 the varying light intensity coming through the transparency. The gradient signal is transmitted to a receiver 114 along with a keying signal and recorded in a conventional way as a monochromatic image 116 to be used in the preparation of a monochromatic printing 50*a* upon a color line sheet 60*a* (FIG. 8*a*). It will be appreciated that with gradiency inverted signals the embodiment of FIGS. 8*g* and 8*h* can be used directly.

It will be observed that as a line in the monochromatic image passes from a position exposing one color line to a position exposing another color line of two contiguous color lines the color perceived changes through the color spectrum present between them. From yellow-red to green the flight of colors would include a perception of yellow and various hues thereof. Thus, with lines of only two colors many resultant colors could be perceived while with three primary colors, the major portion of the spectrum would be perceived.

Having thus described the invention and several modifications thereof, it will be seen how the objects and advantages mentioned are accomplished and how modifications and changes can be made therein without departing from the spirit of the invention the scope of which is commensurate with the appended claims.

What is claimed is:

1. The process of reproducing an original color image comprising refracting and focusing predetermined colors in the original image in separate narrow lines of a recurrent pattern of colors to form a secondary color image of the original image on a viewing surface and recording the gradients of the color in each line in related varying intensities of light to form an intelligible monochromatic gradient line image, and with respect to each other superposing the monochromatic image and a prepared color separation surface of corresponding color lines of said recurrent pattern of colors whose translucent intensity is varied by the monochromatic image lines in direct relation to the presence of the colors in the original image for the perception of color in the monochromatic image.

2. The process of reproducing an original color image comprising separating and focusing predetermined colors in the original image into narrow lines of a recurrent pattern of predetermined colors on a viewing surface to form a secondary image of the original image and recording the gradients of the color in each line in related varying intensities of light to form an intelligible translucent monochromatic gradient line image, and with respect to each other superposing the monochromatic image and a correlated corresponding translucent color separation surface of said recurrent pattern of colors whose translucent intensity is varied by the monochromatic image lines in direct relation to the presence of the colors in the original image and projecting through the superposed monochromatic image and color separation surface an illuminating light for the perception of color in the monochromatic image upon a viewing screen.

3. The process of reproducing an original color image comprising color separating and projecting the original color image on a viewing surface with separation of colors that are in the original image arranged in narrow lineal paths of a recurrent pattern of predetermined colors, recording the varying intensities of the colors along each of their paths in gradient intensities of light to form an intelligible monochromatic gradient line image, and superposing with respect to each other said monochromatic image and correspondingly correlated color lines of a recurrent illuminated pattern of colors whose illumination intensity is varied by said lineal paths in direct relation to the presence of the color in the original image for the perception of color in the monochromatic image.

4. The process called for in claim 3 in which said correspondingly correlated color lines define a master viewing surface containing a certain number of recurrent parallel lines of primary colors and said projected monochromatic image controls the visibilty of the illuminated colors in each color line in relation to their presence and intensity in the original color image at predetermined corresponding points.

References Cited by the Examiner

UNITED STATES PATENTS

| | | | |
|---|---|---|---|
| 611,457 | 9/1898 | McDonough | 96—118 |
| 747,961 | 12/1903 | Frauenfelder | 352—67 X |
| 1,989,553 | 1/1935 | Kanolt | 88—1 |

DAVID G. REDINBAUGH, *Primary Examiner.*

J. H. SCOTT, J. A. O'BRIEN, *Assistant Examiners.*